(12) United States Patent
Glitsch et al.

(10) Patent No.: US 11,786,934 B2
(45) Date of Patent: Oct. 17, 2023

(54) ULTRASOUND TRANSDUCER HAVING AT LEAST ONE PIEZOELECTRIC OSCILLATOR

(71) Applicant: Continental Automotive GmbH, Hannover (DE)

(72) Inventors: Rolf Glitsch, Bad Soden (DE); Siegfried Reck, Nienburg/Wesser (DE)

(73) Assignee: Continental Automotive GmbH, Hannover (DE)

( * ) Notice: Subject to any disclaimer, the term of this patent is extended or adjusted under 35 U.S.C. 154(b) by 437 days.

(21) Appl. No.: 16/859,456

(22) Filed: Apr. 27, 2020

(65) Prior Publication Data

US 2020/0276612 A1 Sep. 3, 2020

Related U.S. Application Data

(63) Continuation of application No. PCT/EP2018/078826, filed on Oct. 22, 2018.

(30) Foreign Application Priority Data

Oct. 27, 2017 (DE) ............ 10 2017 219 406.5
Nov. 30, 2017 (DE) ............ 10 2017 221 618.2

(51) Int. Cl.
  *B06B 1/06* (2006.01)
  *G01S 7/521* (2006.01)
  (Continued)

(52) U.S. Cl.
  CPC ............ *B06B 1/0681* (2013.01); *G01S 7/521* (2013.01); *G01S 15/08* (2013.01); *G01S 15/88* (2013.01);
  (Continued)

(58) Field of Classification Search
  CPC ..... B06B 1/0681; B06B 1/0685; G01S 7/521; G01S 15/08; G01S 9/22; G01S 15/88;
  (Continued)

(56) References Cited

U.S. PATENT DOCUMENTS 4,326,274 A 4/1982 Hotta et al.
4,556,814 A * 12/1985 Ito ............... G10K 11/002
  73/644

(Continued)

FOREIGN PATENT DOCUMENTS

DE 19601656 A1 7/1997
DE 19811982 A1 9/1999
(Continued)

OTHER PUBLICATIONS

Heinrich Kuttruff, "Physik und Technik des Ultraschalls", S. Hirzel Verlag, Stuttgart, 1988.
(Continued)

*Primary Examiner* — Jacques M Saint Surin

(57) ABSTRACT

An ultrasound transducer with at least one piezoelectric oscillator, a damping compound and at least one electrically conductive conducting element that is in contact with the piezoelectric oscillator. The damping compound in an ultrasound transducer encloses at least the at least one conducting element, and the composite structure of the at least one conducting element and of the damping compound is designed such that the composite structure is in contact over an area with the piezoelectric oscillator, and forms a support on the side of the ultrasound transducer that faces away from the piezoelectric oscillator on which the ultrasound transducer can be supported.

21 Claims, 3 Drawing Sheets

(51) Int. Cl.
*G01S 15/08* (2006.01)
*G01S 15/88* (2006.01)
*G10K 9/22* (2006.01)
*G10K 11/00* (2006.01)

(52) U.S. Cl.
CPC .............. *G10K 9/22* (2013.01); *G10K 11/002*
(2013.01); *B60G 2202/152* (2013.01); *B60G 2400/252* (2013.01); *B60G 2401/10* (2013.01); *B60G 2401/176* (2013.01); *B60G 2500/30* (2013.01)

(58) Field of Classification Search
CPC .. G10K 9/22; G10K 11/002; B60G 2400/252; B60G 2401/10; B60G 2401/176; B60G 2202/152; B60B 2500/30
USPC .......................................................... 73/571
See application file for complete search history.

(56) References Cited

U.S. PATENT DOCUMENTS

| | | | | |
|---|---|---|---|---|
| 5,457,352 A * | 10/1995 | Muller | ................. | G01F 23/296 |
| | | | | 310/334 |
| 6,792,810 B2 | 9/2004 | Kupfernagel | ........ | G10K 11/002 |
| | | | | 73/632 |
| 6,897,601 B2 * | 5/2005 | Birth | ..................... | H01L 41/187 |
| | | | | 310/326 |
| 8,492,954 B2 * | 7/2013 | Kim | ..................... | G10K 11/004 |
| | | | | 310/334 |
| 8,616,654 B2 * | 12/2013 | Zenk | ..................... | B60N 2/914 |
| | | | | 297/284.6 |
| 9,703,593 B2 * | 7/2017 | Lee | ........................... | G06F 9/46 |
| 9,897,471 B2 * | 2/2018 | Wiest | ..................... | G01F 1/662 |
| 2012/0153777 A1 | 6/2012 | Ueberschlag et al. | | |

FOREIGN PATENT DOCUMENTS

| | | | | |
|---|---|---|---|---|
| DE | 102007049212 A1 | 4/2009 | | |
| EP | 2466274 A1 | 6/2012 | | |
| EP | 2630856 A2 * | 8/2013 | .......... | A01D 41/141 |
| EP | 2858378 A1 | 4/2015 | | |
| GB | 2214031 A | 8/1989 | | |
| JP | S51124460 U | 10/1976 | | |
| JP | S5520034 U | 2/1980 | | |
| JP | H01190100 A | 7/1989 | | |
| JP | 2000228796 A | 8/2000 | | |
| WO | 2016190993 A1 | 12/2016 | | |

OTHER PUBLICATIONS

Office Action dated Sep. 5, 2018 from corresponding German Patent Application No. DE 10 2017 221 618.2.
International Search Report and Written Opinion dated Feb. 1, 2019 from corresponding International Patent Application No. PCT/EP2018/078826.

* cited by examiner

ULTRASOUND TRANSDUCER HAVING AT LEAST ONE PIEZOELECTRIC OSCILLATOR

CROSS REFERENCE TO RELATED APPLICATIONS

This U.S. patent application claims the benefit of PCT patent application No. PCT/EP2018/078826, filed Oct. 22, 2018, which claims the benefit of German patent application No. 10 2017 219 406.5, filed Oct. 27, 2017 and German patent application No. 10 2017 221 618.2, filed Nov. 30, 2017, all of which are hereby incorporated by reference.

TECHNICAL FIELD

The invention relates to an ultrasound transducer with at least one piezoelectric oscillator, a damping compound and at least one electrically conductive conducting element.

BACKGROUND

An ultrasound transducer converts an electrical signal, thus also an electrical oscillation, into an acoustic signal, and thus also an acoustic oscillation, and vice versa. Ultrasound transducers that use an oscillator made of a piezoelectric ceramic are known. Ultrasound transducers for gaseous oscillation media usually comprise a disk-shaped oscillator made of a piezoelectric ceramic, what is known as an adaptation layer on the side of the oscillator that faces the oscillation medium, and a means for damping the oscillations on the side of the oscillator that faces away from the oscillation medium. The means for damping usually also serves to suppress reflections on the side of the oscillator that faces away from the medium.

If an electrical voltage that changes over time is applied to two opposing sides of a piezoelectric oscillator, or if a piezoelectric oscillator is brought into an electric field that changes over time, then the oscillator, driven by this, performs mechanical oscillations that can be transmitted acoustically. In order to transfer an acoustic oscillation generated in this way, which is to say sound or ultrasound, as effectively as possible to an oscillation medium, the adaptation layer can be matched to the acoustic impedances of the oscillator and of the oscillation medium, for example air.

Conversely, the application of mechanical stress to a piezoelectric oscillator has the effect that an electrical voltage can be measured between two opposing surfaces of the oscillator.

In known ultrasound transducers with piezoelectric oscillators, the means for electrically connecting the piezoelectric oscillator also transmits acoustic oscillations to electrical and electronic components such as, for example, circuit boards. The transmission of acoustic oscillations to electrical or electronic components can cause signal distortions and overshoots. When the useful signal of, for example, an aerial acoustic echo is being received by a reception means, which is, for example, arranged on a circuit board, the oscillations excited or transmitted by a piezoelectric oscillator overlay the oscillation. For this reason, the transmission of the acoustic oscillations to reception means can interfere with the reception of useful signals.

Known solutions for electrical connection of piezoelectric oscillators by means of wire bonds, i.e. bonding with very thin wires, or soldered braids are laborious, error-prone, expensive and do not deliver the desired quality.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An ultrasound transducer with at least one piezoelectric oscillator, a damping compound and at least one electrically conductive conducting element that is in contact with the piezoelectric oscillator is characterized in that the damping compound encloses at least the at least one conducting element, and the composite structure of the at least one conducting element and of the damping compound is designed such that the composite structure is in contact over an area with the piezoelectric oscillator, and forms a support on the side of the ultrasound transducer that faces away from the piezoelectric oscillator on which the ultrasound transducer can be supported.

The piezoelectric oscillator is manufactured, for example, of a piezoceramic, and is not electrically conductive.

The ultrasound transducer can be designed such that it can be arranged and/or fastened on a circuit board.

The following relationship between the frequency (f), the wave propagation velocity (c) and the wavelength lambda ($\lambda$) is known for wave propagation: $\lambda = c/f$.

In the case of mechanical oscillations, the sound velocity in the respective material is the relevant wave propagation velocity. Mechanical oscillations also comprise acoustic oscillations. In the case of superimposing waves or standing waves, the position of oscillation nodes can be determined from this relationship. On the other hand, a wavelength $\lambda = c/f$ corresponding to a known working frequency f of an oscillator can, for example, be determined from this relationship.

An ultrasound transducer can be employed for the determination of the distance between two points, for example for the determination of the height of an air suspension of a motor vehicle.

In one embodiment of an ultrasound transducer the conducting element or elements is or are implemented as helical springs. These helical springs may be manufactured of a metal material. A metal or metal alloy with good electrical conductivity, high shear modulus and high compression modulus, for example tin bronze and similar copper-tin compounds, are suitable as a wire material here. A typical diameter of the wire can, for example, be 0.4 mm. The conductivity or solderability are here further improved through, for example, a coating or covering of silver or tin. Wire lengths can, for example, lie in the range from 50 to 150 mm. Windings of the wire in helical form can, for example, have diameters of about 3-6 mm.

If a measuring device with an ultrasound transducer is employed in a pneumatic suspension, the present elongation of the pneumatic suspension element can be determined from the transit time of an ultrasound signal. The distance of the ultrasound transducer from the side located on the opposite side of a pneumatic suspension bellows can be measured here using the ultrasound transducer through the transit time of an ultrasound signal. The change to the elongation of the pneumatic suspension element causes the change in the relative height of the pneumatic suspension element. The chassis of a vehicle that is fitted with a pneumatic suspension can be raised or lowered with respect to the axles in that the elongation of the pneumatic suspension element is enlarged or reduced. The information about the present elongation of a pneumatic suspension element can thus be used, for example, for the control of a level regulation or monitoring of a vehicle.

The elongation of a pneumatic suspension element corresponds to a relative height of, for example, a suspension strut fitted with said element with respect to a reference. When the vehicle is stationary, the calibration magnitude of a level regulation can be a static height, while when moving an averaged height can, for example, be used as the calibration magnitude. When a measuring device with ultrasound transducer is used in a pneumatic suspension system, the measuring device can be screwed from the outside onto a suspension element, for example onto a housing or a suspension bellows, or can also be arranged in the interior of a pneumatic suspension element, for example in the interior of a suspension bellows.

An ultrasound transducer with a piezoelectric oscillator is usually constructed such that an oscillation medium that is to be excited is coupled to the piezoelectric oscillator via what is known as an adaptation layer. The adaptation layer serves to couple the piezoelectric oscillator as effectively as possible to the medium that is to be set into oscillation or the medium whose oscillations are to be captured with the oscillator. A good coupling is, for example, characterized in that the transfer losses when transferring an oscillation of the medium to the oscillator or an oscillation of the oscillator to the medium are as low as possible.

The adaptation layer is typically located on the side of the piezoelectric oscillator that faces the medium that is to be excited. The thickness of the adaptation layer, i.e. the extent of the adaptation layer perpendicular to the surface that is in contact with the oscillator, can here be configured in such a way, depending on the working frequency of the ultrasound transducer, that its thickness has one quarter of the working frequency. This is what is known as the quarter-lambda adaptation.

The damping compound contributes to the elastic modulus of the ultrasound transducer, in particular when the conducting element or elements and the adaptation layer are fully or partially surrounded by the damping compound of the piezoelectric oscillator. The interior volume formed by the adaptation layer, the piezoelectric oscillator and a rear side, i.e. the side that faces away from the medium to be excited, of an ultrasound transducer can thus, for example, be filled with a damping compound. The side that faces away from the medium to be excited can, for example, be implemented as a housing wall or circuit board. Oscillations of the oscillator are transferred via the damping compound or the composite structure of the damping compound and the conducting element or elements to the adaptation layer, and thus to the oscillation medium.

The damping compound is chosen such that it minimizes the transmission of oscillation energy to the "rear side" of the ultrasound transducer, i.e. the support on the side that faces away from the oscillation medium. The damping compound can also serve to hold the various components of the ultrasound transducer together. The damping compound is typically not surrounded by a housing, but is for example given its shape through a casting method during manufacture. The volume filled by the damping compound is thus in many regions not bounded by other components of the ultrasound transducer, but the boundary surface of the damping compound rather forms the outer boundary of the ultrasound transducer there. It is, however, also possible for the damping compound to be surrounded by a housing. It is furthermore possible to surround the damping compound with a flexible foil. Polymers such as silicones (poly[organo]siloxanes), plastics such as for example polyurethane plastics, elastomers or epoxy resins may be considered as materials for the damping compound.

In one exemplary embodiment, the ultrasound transducer comprises at least one suspension element of wire. This suspension element or these suspension elements can, for example, be helical springs. In this exemplary embodiment, the wire length of this or these suspension elements is adjusted to the working frequency of the ultrasound transducer in such a way that the ends of the suspension elements that face away from the piezoelectric oscillator which can, for example, comprise soldering regions, experience a minimum deflection, e.g. zero, in the presence of oscillation. In the event of oscillation, these ends of the suspension elements are located at the site of an oscillation node.

If the oscillation occurring is viewed as a standing wave, then these ends are located at wave nodes. This configuration gives rise, inter alia, that, on the one hand, the solder sites are subjected to the lowest possible oscillation and shock and, on the other hand, that acoustic oscillations of the piezoelectric oscillator are transmitted as little as possible to electric components that are connected to the solder sites of the suspension elements. The electrical components, for example a circuit board, are accordingly acoustically decoupled from the piezoelectric oscillator as effectively as possible. An inward coupling quality of acoustic oscillations into the medium to be excited by the oscillator, for example a gaseous medium, follows from this decoupling, since less of the oscillation power of the oscillator is transmitted as a power loss to the electrical components.

In one variant, the piezoelectric oscillator of an ultrasound transducer has an at least partial metallization of the surface for making electrical contact on one or two sides. In a development of an ultrasound transducer in which two sides of the piezoelectric oscillator have an at least partial metallization, the metallization is carried from one side over a further side of the oscillator in such a way that both metallizations form electrically separate regions on one side of the oscillator. This allows two suspension elements to be arranged on this side, and thus the creation of both electrical contact and acoustic decoupling of the piezoelectric oscillator. The two metallization regions here are electrically separate, since the piezoceramic of the piezoelectric oscillator is not electrically conductive, and a non-metallized region is located between the two metallized regions.

The side of the piezoelectric oscillator on which the two metallized regions are located can, for example, be designed such that the sizes of the two metallized surfaces have a ratio of 85 to 15 or 95 to 5, wherein the respective non-metallized region is not included in the ratio. The portion with the smaller area here is the one whose metallization is carried around another side of the piezoelectric oscillator and which is connected to the side that is opposite to the side with two metallized regions.

In one embodiment of ultrasound transducers or a pneumatic suspension device with ultrasound transducers and of a measuring device with ultrasound transducers, a temperature, e.g. a temperature of the oscillation medium, is additionally determined and employed, for example, for correction of the relevant sound propagation for the distance determination.

In one embodiment of ultrasound transducers or a pneumatic suspension device with ultrasound transducers and of a measuring device with ultrasound transducers, a pressure, in particular a pressure of the oscillation medium, is additionally directly or indirectly determined and employed, for example, for correction of the relevant sound propagation for the distance determination. The pressure determined can be displayed to a driver of a vehicle or the operator of an industrial plant that comprises the ultrasound transducer, or made available via an interface or a bus to further devices or instances in a vehicle or an industrial plant. A pressure can for example be employed for what is known as on-board weighing, i.e. weighing performed by the vehicle itself, since, for example, a weight of the load on an axle has an influence on the pressure of the oscillation medium in a pneumatic suspension at this axle.

In one embodiment of ultrasound transducers or a pneumatic suspension device with ultrasound transducers and of a measurement device with ultrasound transducers, a temperature and pressure are additionally determined.

Measurement devices for measuring the pressure of a gaseous medium and/or for measuring a distance comprise an ultrasound transducer as described herein.

The press-fit technique may be employed for connecting various components of the ultrasound transducer proposed here to circuit boards. Solderless connections to circuit boards can be fabricated by means of the press-fit technique. A circuit board that is to be connected to components of the ultrasound transducer here comprises through-holes with metallized edges, and metal pins are arranged at the components of the ultrasound transducer that are to be connected, and are connected to those components of the ultrasound transducer that are to be connected.

According to the press-fit technique these pins can form a connection to the circuit board or boards that is at the same time electrically conductive and mechanically fixing, in that the components of the ultrasound transducer that are to be connected, and the circuit board or circuit boards, are brought together in such a way that the pins protrude through the metallized through-holes on the circuit board and thus connect the pins and the circuit board or circuit boards in accordance with the press-fit technique. It is characteristic that the pins, also referred to as press-fit pins, are pressed into the metallized through-hole or holes. In order for a firm connection to result, it is necessary that a diagonal of a pin cross-section is larger than the diameter of the hole that is to be connected therewith. Either the pin or the hole thus deforms during the pressing. It is possible here for the pins to be solid, which results in deformation of the hole during the pressing, or for the pins to be deformable, for example in that they comprise a hollow region with, for example, spring characteristics.

In one form of embodiment of an ultrasound transducer, the composite structure of the damping compound and the conducting element or elements is designed such that oscillations of the piezoelectric oscillator are damped on their way through the composite structure in such a way that their amplitude at the support is weaker by a factor of at least 10 than at the piezoelectric oscillator. In this way it is possible for the transmission of oscillations of the piezoelectric oscillator to the further elements lying against the support, and/or reflections of oscillations at the further elements lying against the support, to be reduced. The ultrasound transducer may be designed such that the distance between the piezoelectric oscillator and the support is as large as possible and/or the effective length of conducting elements is as great as possible, so that the oscillations, as they propagate as a wave through the damping compound and/or conducting elements, have to cover the longest possible distance to the support, and therefore can be damped over a distance that is as long as possible.

The acoustic impedance of the damping compound is furthermore relevant for the attenuation of the amplitude of an oscillation along its propagation path through the damping compound. The acoustic impedance of the damping compound is therefore also relevant to the amplitude with which an oscillation is transmitted to further elements, for example a circuit board, that lie against the support of the ultrasound transducer. In one development of this form of embodiment with a material for the damping compound, for example epoxy resin or another of the materials referred to above, an attenuation of the amplitude by a factor of 100 can be achieved.

In one form of embodiment of an ultrasound transducer, the composite structure of the damping compound and the conducting element or elements is designed such that oscillations of the piezoelectric oscillator are damped on their way through the composite structure in such a way that their amplitude at the support is weaker by a factor of at least 100 than at the piezoelectric oscillator. In this way it is possible for the transmission of oscillations of the piezoelectric oscillator to the further elements lying against the support, and/or reflections of oscillations at the further elements lying against the support, to be reduced. It can be possible here to design the ultrasound transducer such that the distance between the piezoelectric oscillator and the support is as large as possible and/or the effective length of conducting elements is as great as possible, so that the oscillations, as they propagate as a wave through the damping compound and/or conducting elements, have to cover the longest possible distance to the support, and therefore can be damped over a distance that is as long as possible.

In one form of embodiment of an ultrasound transducer, the length of the conducting element or elements is matched to a working frequency of the piezoelectric oscillator in such a way that the transmission of oscillation energy from oscillations of the piezoelectric oscillator at the support is minimized in that a condition for an oscillation node is present at the support. In this way it is possible for the transmission of oscillations of the piezoelectric oscillator to the further elements lying against the support, and/or reflections of oscillations at the further elements lying against the support, to be reduced.

The maximum oscillation amplitude of the oscillations excited or transmitted from the oscillator occurs at the end of a conducting element that is in contact with the piezoelectric oscillator, since this end oscillates with the oscillator. In the same way, the maximum oscillation amplitude occurs in the damping compound at the place where it is in contact with the oscillator.

The other end of a conducting element, which is therefore not in contact with the oscillator, should, according to this form of embodiment of an ultrasound transducer, oscillate little with the oscillation excited or transmitted from the oscillator. In this form of embodiment, the length of the conducting element or elements is matched to a working frequency of the piezoelectric oscillator such that the condition for an oscillation node is present at the support of the ultrasound transducer. For the wavelength lambda ($\lambda$), the length (L) of the conducting element or elements and a natural number (k), i.e. k is one element from the series of natural numbers 1, 2, 3, etc., a condition for an oscillation node is present if the following condition is fulfilled:

$$L=k*(\lambda/2)-(\lambda/4).$$

This condition can also be formulated as follows:

$$L=(2*k-1)*(\lambda/4).$$

If the path length of the propagation of an oscillation or wave through the damping compound is substituted for L, analogous conditions for oscillation nodes in the damping compound are obtained.

In summary, the condition for an oscillation node at the support is given if the length of the conducting element or elements, and/or of the distance between the piezoelectric oscillator and the support that is bridged by the composite structure, is designed such that the length and/or the distance is an uneven multiple of one quarter of the wavelength corresponding to the working frequency of the piezoelectric oscillator.

In a further form of embodiment of an ultrasound transducer, the distance between the piezoelectric oscillator and the support that is bridged by the composite structure of the damping compound and the conducting element or elements is matched to a working frequency of the piezoelectric oscillator in such a way that the transmission of oscillation energy from oscillations of the piezoelectric oscillator at the support is minimized in that a condition for an oscillation node is present at the support. The distance corresponds to a distance covered by the oscillation as it propagates through the damping compound. In this way it is possible for the transmission of oscillations of the piezoelectric oscillator to the further elements lying against the support, and/or reflections of oscillations at the further elements lying against the support, to be reduced.

In a further form of embodiment of an ultrasound transducer, both the conducting element or elements considered in isolation as well as the composite structure to which the conducting element or elements also belong are matched to a working frequency of the piezoelectric oscillator in such a way that the transmission of oscillation energy from oscillations of the piezoelectric oscillator at the support is minimized in that the condition for an oscillation node is present at the support. In this way it is possible for the transmission of oscillations of the piezoelectric oscillator to the further elements lying against the support, and/or reflections of oscillations at the further elements lying against the support, to be reduced.

In one form of embodiment of an ultrasound transducer, in which the length of the conducting element(s), or the distance between the piezoelectric oscillator and the support that is bridged by the composite structure of the damping compound and the conducting element(s), or also the conducting element(s) considered in isolation, as well as the composite structure to which the conducting element(s) also belong, is matched to a working frequency of the piezoelectric oscillator. The match to the working frequency is in such a way that the condition for an oscillation node at the support is given in that the length of the conducting element(s), and/or of the distance between the piezoelectric oscillator and the support that is bridged by the composite structure is such that the length and/or the distance is an uneven multiple of one quarter of the wavelength corresponding to the working frequency of the piezoelectric oscillator. In that the condition for an oscillation node at the support of the ultrasound transducer is maintained in this way, the transmission of oscillations of the piezoelectric oscillator to further elements that lie against the support and/or reflections of oscillations at further elements that lie against the support can be reduced.

In one form of embodiment of an ultrasound transducer, the conducting element(s) is designed as a helical spring(s). Through a conducting element wound into the form of a helix, a high wire length is enabled in which, thanks to the larger path length, a more marked damping of acoustic oscillations takes place. Preferably, such helical springs can be wound immediately before being put together with the piezoelectric oscillator in a manufacturing process or assembly process of an ultrasound transducer. Due to the low space requirements and the mechanical stability of helical springs, simplifications arise in the arrangement of the conducting elements implemented as helical springs and the contacting of the piezoelectric oscillator with such conducting elements. It is, furthermore, made possible for the assembly as a combined component of piezoelectric oscillator and a helical spring or springs to be handled jointly in the further manufacturing process of an ultrasound transducer.

A further form of embodiment of an ultrasound transducer comprises at least two helical springs as conducting elements. Since a piezoelectric oscillator must be subjected to different electric fields or potentials simultaneously at, at least two different locations in order to exhibit a piezoelectric effect, at least two conducting elements may be useful. The use of conducting elements designed as helical springs exhibit a convenient assembly and good damping properties from the point of view of acoustic oscillations.

In a further form of embodiment of an ultrasound transducer, the surface of the piezoelectric oscillator comprises a metallization for electrical contact in one or a plurality of regions. The contacting or application of operating voltages to the piezoelectric oscillator is in this way enabled. A particularly space-saving contact with, at the same time, a spatial homogeneity of the applied voltage is enabled through a metallization.

In a further form of embodiment of an ultrasound transducer with a piezoelectric oscillator that comprises metallized regions on two opposite sides, the surfaces of the sides of the oscillator that have the metallizations are wholly or partially covered by metallization, and the metallization is carried over from a first side via a third side of the oscillator to a second side of the oscillator in such a way that both metallizations form electrically separate regions on either the first or the second side of the oscillator. The contacting of the piezoelectric oscillator is thereby simplified. A contacting can, in addition, take place thereby in a space-saving manner.

Since piezoelectric ceramics are typically not electrically conductive, a relatively small discontinuation between the different metallized regions is sufficient to separate them electrically. For example, on one side of the piezoelectric oscillator, a proportion of almost 95% of the surface can be taken up by a metallized region, whereas almost 5% of the surface is given over to the proportion that is electrically connected to a metallized surface on the surface of the opposite side of the piezoelectric oscillator. A small surface proportion of less than 1% of the surface is given over to the non-metallized region that separates the two metallized regions from one another. It is, however, also conceivable that a larger proportion is given over to the separation. A different surface distribution is, furthermore, also conceivable, such as for example a distribution of almost 85% to almost 15%, or a distribution of 84.5% to 14.5%, wherein in the latter case 1% would be given over to the non-metallized region for electrical separation.

In a further form of embodiment of an ultrasound transducer with at least two helical springs as conducting elements and a piezoelectric oscillator that comprises metallized regions on two opposite sides, wherein the surfaces of the sides of the oscillator that have the metallizations are wholly or partially covered by metallization, and the metallization is carried over from a first side via a third side of the oscillator to a second side of the oscillator in such a way that both metallizations form electrically separate regions on either the first or the second side of the oscillator, each of the two helical springs is in electrical contact with respectively one of the electrically separated regions of the metallization of the piezoelectric oscillator. It is thereby made possible to arrange two helical springs on one metallized side of the piezoelectric oscillator, while the opposite side of the oscillator can remain free with the exception of the metallization, and can thus, for example, be brought into contact with an adaptation layer, wherein only the metallization has to be between the oscillator and the adaptation layer.

In one form of embodiment of an ultrasound transducer, the ends of the conducting elements that are not in contact with the piezoelectric oscillator comprise contact regions with which electrical connections can be formed to a circuit board or other electrical components. In this way, the electrical connection of the conducting elements, and thus of the oscillator, to further electrical components, for example to evaluation electronics, is enabled by means, for example, of soldering, clamping, gluing or (spot) welding. The ends of the conducting elements that are not in contact with the piezoelectric oscillator can for example also comprise contact pins, either directly or via a mediating element, with which a connection is possible by means of press-fit techniques.

In one form of embodiment of an ultrasound transducer, the support is supported on a circuit board directly or via one or a plurality of mediating structural elements. In this way a construction of an ultrasound transducer that is compact and robust, and therefore economical and low-maintenance, is enabled.

In one particularly form of embodiment of an ultrasound transducer, the damping compound consists of an elastomer material. Through the use of such material, vibration properties of the damping compound, and easy handling during the manufacture of an ultrasound transducer, are enabled.

A measurement device for measuring a distance comprises an ultrasound transducer as disclosed herein.

A pneumatic suspension apparatus for a motor vehicle comprises a measurement device for measuring a distance with an ultrasound transducer as disclosed herein.

A motor vehicle or rail vehicle comprises a pneumatic suspension apparatus with a measurement device for measuring a distance with an ultrasound transducer as disclosed herein.

An industrial plant comprises a measurement device with an ultrasound transducer as disclosed herein, wherein the measurement device is used for the regulation of a height adjustment of the industrial plant.

A seat control or a seat comprises an ultrasound transducer as disclosed herein, wherein the ultrasound transducer is used in connection with a regulation or control of the seat height.

A mining vehicle, an agricultural vehicle or an agricultural attachment comprises an ultrasound transducer as disclosed herein, wherein the ultrasound transducer is used in connection with the regulation or control of a height, a level or a distance.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
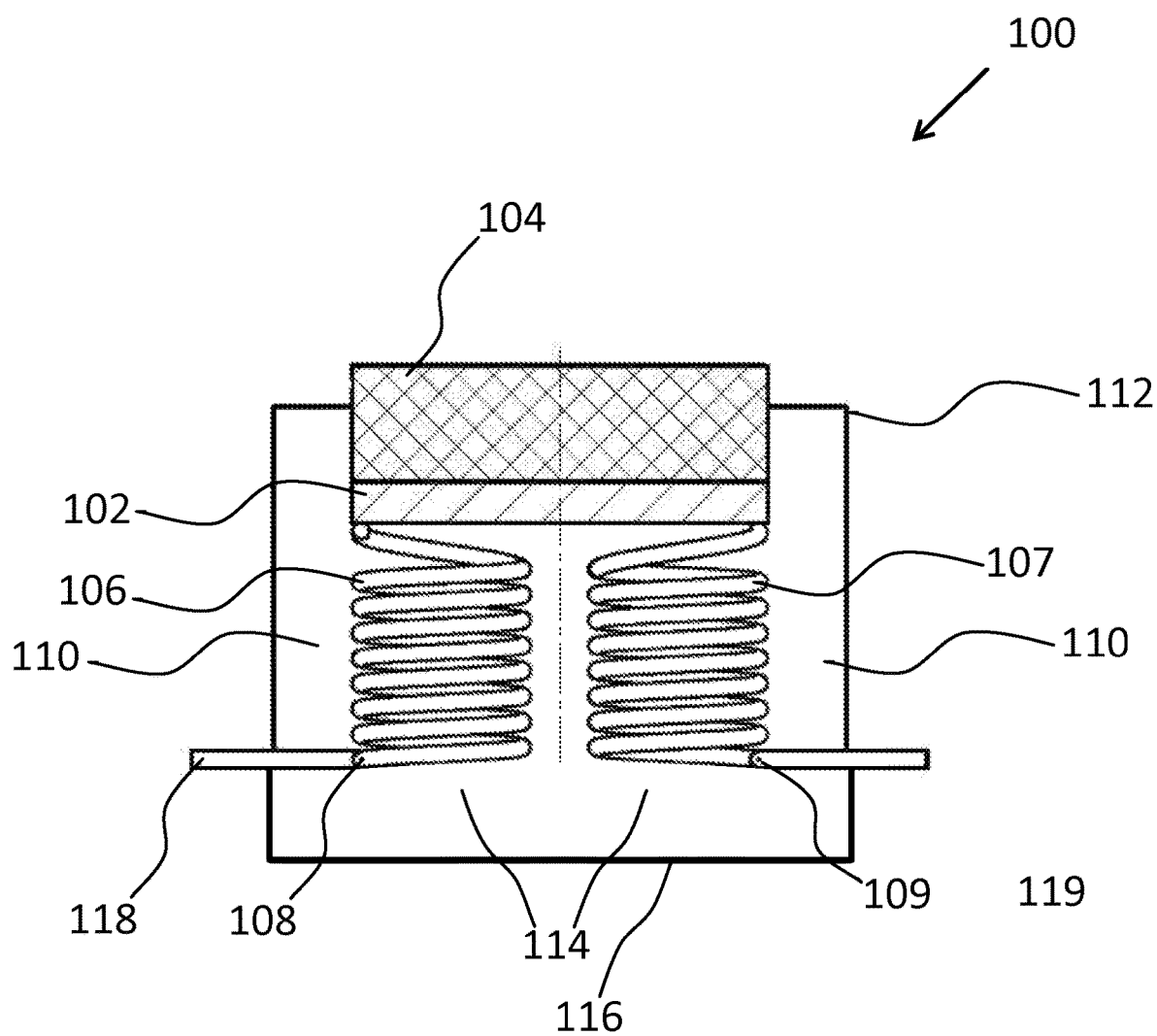
FIG. 1 shows a sectional drawing of an ultrasound transducer.

FIG. 1 shows a sectional drawing of an ultrasound transducer 100. The form of embodiment of the ultrasound transducer 100 shown here comprises a piezoelectric oscillator 102 and two conducting elements 106, 107 implemented as helical springs. The conducting elements 106, 107 are each in contact with the piezoelectric oscillator 102 at one end. The piezoelectric oscillator here may be metallized on two opposite sides for electrical contact, and each of the two helical springs is in electrical contact with respectively one of the electrically separate regions of the metallization of the piezoelectric oscillator. The conducting elements 106, 107 are furthermore largely enclosed by a damping compound 110. The composite structure 114 of conducting elements 106, 107 and damping compound 110 forms a support 116. The damping compound 110 can be applied in a casting method in one operation during the manufacture of the ultrasound transducer 100. It is, however, also possible that the support 114 also comprises further materials or can be extended through one or a plurality of structural elements 115 that can contribute to forming the support 116. The structural element or elements 115 can consist of a different material, for example of a plastic. On its side that faces away from the piezoelectric oscillator 102 the composite structure 114 can be in contact in the region of the support 116 with further components of an arrangement with an ultrasound transducer 100. A circuit board 120, a housing part, or a further structural element can, for example, be arranged there.

The boundary surfaces 112 mark the boundaries of the volume filled by the damping compound 110, where other components of the ultrasound transducer 100 are not in immediate contact with the damping compound 110. In this form of embodiment of an ultrasound transducer 100, the damping compound 110 is not surrounded by a housing at the boundary surfaces 112 in order to ensure the best possible damping properties and not changing them through a rigid housing. Other forms of embodiment of an ultrasound transducer 100 are conceivable in which the damping compound 110 is fully or partially surrounded by a housing at the boundary surfaces 112. Apart from a rigid housing, it is also conceivable that the damping compound 110 is fully or partially surrounded at the boundary surfaces 112 with a flexible foil. Other variants are also conceivable, in which the damping compound 110 is surrounded by a housing or a foil at all the boundary surfaces 112, apart from the boundary surface that faces away from the piezoelectric oscillator 102. The support 116 can be in contact there with further components of an arrangement with an ultrasound transducer 100 according to the invention. A circuit board 120, a housing part or a structural element can, for example, be arranged there.

In the form of embodiment illustrated, the conducting elements 106, 107 comprise contact regions 108, 109. The contact regions 108, 109 are located at the ends of the conducting elements 106, 107, implemented here as helical springs, that are not in contact with the piezoelectric oscillator 102. Electrical connections to a circuit board 120 or to other electrical or electronic components can be formed with the contact regions 108, 109. In the illustrated form of embodiment, contacting elements 118, 119 are in contact with the contact regions 108, 109 of the conducting elements 106, 107. The connection that makes contact between the contact regions 108, 109 and the contacting elements 118, 119, or between the contact regions 108, 109 and a circuit board 120 or other electrical or electronic components can be fabricated through soldering, clamping, welding, gluing or other ways.

The damping compound 110 totally or partially encloses further components of the ultrasound transducer 100. In the variant shown, the two conducting elements 106, 107 implemented as helical springs, and the piezoelectric oscillator 102 are enclosed by the damping compound 110. An adaptation layer 104, which is also at least partially surrounded by the damping compound 110, is located on the side of the piezoelectric oscillator 102 that faces the oscillation medium. The adaptation layer 104 can be matched to the working frequency and/or the oscillation medium, and serves for the effective transmission of oscillations between the piezoelectric oscillator 102 and the oscillation medium. From this point of view it can also be said that the adaptation layer 104 and the composite structure 114 consisting of damping compound 110 and conducting elements 106, 107 are implemented in pursuit of opposite targets: while the adaptation layer 104 should transmit oscillations as well as possible, the composite structure consisting of damping compound 110 and conducting elements 106, 107 should couple oscillations as poorly as possible, i.e. transmit as little oscillation energy as possible to whatever is in contact with the ultrasound transducer 100 in the region of the support 116. In one form of embodiment, such as that illustrated, in which the conducting elements 106, 107 are surrounded by the damping compound 110, the connection of damping compound 110 and—in this case—helical springs 106, 107 also contributes to the oscillation behavior of the conducting elements 106, 107 or to the elastic modulus of the composite element 114 consisting of conducting elements 106, 107 and damping compound 110, so that the conducting elements 106, 107 and the damping compound 110 are implemented in such a way that a desired oscillation behavior or elastic modulus of the composite structure 114 is achieved.

While the piezoelectric oscillator 102 touches the conducting elements 106, 107 on one side, an adaptation layer 104 is located on its opposite side. The adaptation layer 104 is designed such that oscillations of the piezoelectric oscillator 102 are transferred efficiently to the oscillation medium that is in contact with the adaptation layer 104. Conversely, the adaptation layer 104 is also designed such that oscillations of the medium are passed on as well as possible to the piezoelectric oscillator 102. In other words, the adaptation layer is designed such that it couples the piezoelectric oscillator and the oscillating medium as effectively as possible. Therefore, one possible coupling can, for example, be characterized by the low transmission losses.

Figure 2:
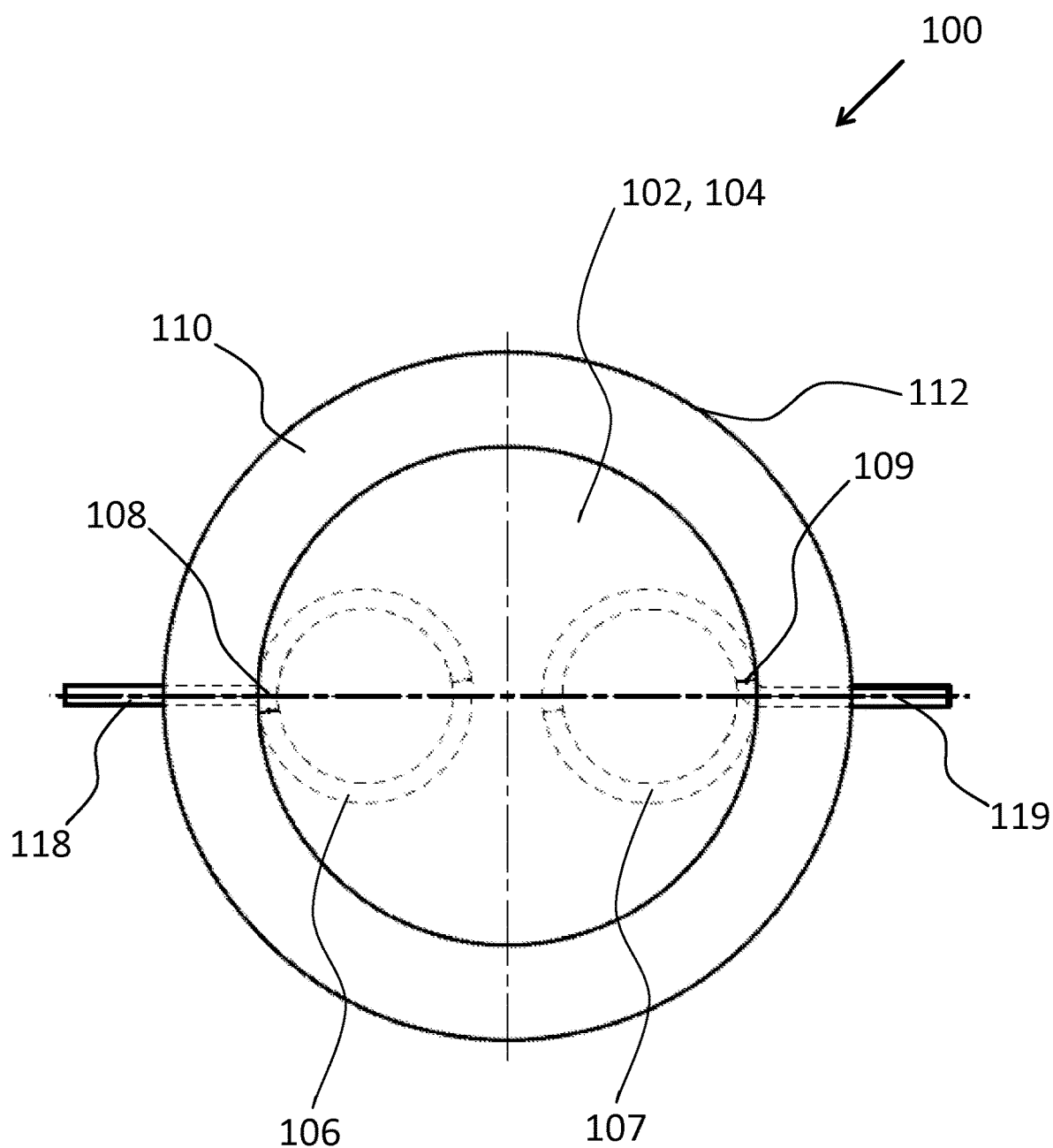
FIG. 2 shows a further sectional drawing of the ultrasound transducer of FIG. 1, wherein the section plane has been rotated through 90° with respect to the section plane of FIG. 1.

FIG. 2 shows a view of an exemplary form of embodiment of an ultrasound transducer 100 in which the adaptation layer 104 lies in front of the piezoelectric oscillator 102 and covers it entirely in this view. It is thus viewed from the direction in which the oscillation medium, air in particular, is located in a typical application of the ultrasound transducer 100. Arranged in a ring around the adaptation layer 104, this view of the exemplary ultrasound transducer 100 shows the damping compound 110 with the boundary surfaces 112 which, together with the conducting elements 106, 107, form a composite structure 114. In this example, the conducting elements 106, 107 are implemented as two helical springs, and are in electrical contact with contacting elements 118, 119 in contact regions 108, 109. The helical springs are suggested by dashed rings. The contacting elements 118, 119 protrude laterally out of the ultrasound transducer 100.

Figure 3:
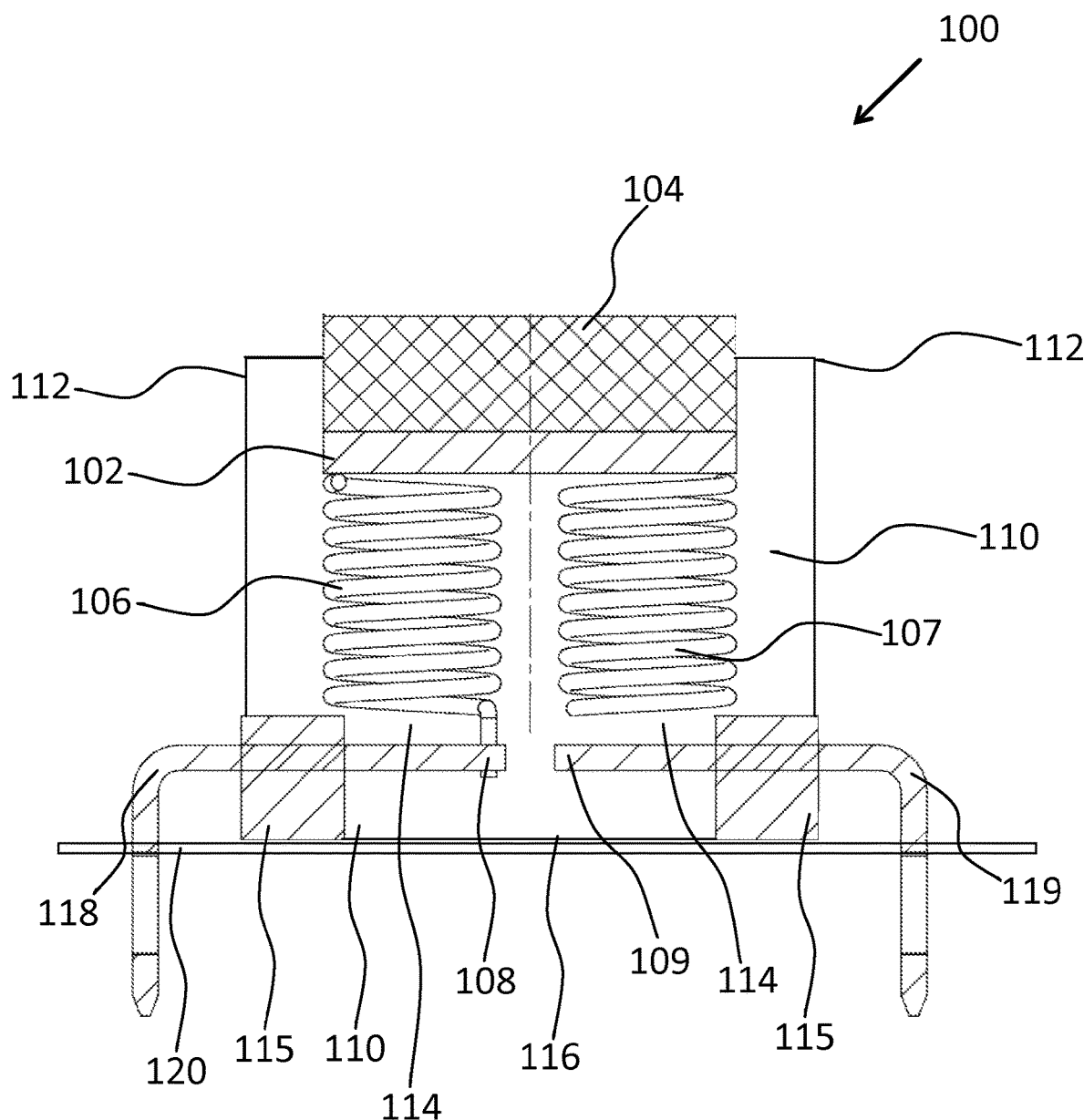
FIG. 3 shows a sectional drawing in the same section plane as in FIG. 1 of an ultrasound transducer with an additional structural element and with contact pins.

In the form of embodiment of an ultrasound transducer 100 shown in FIG. 3, the composite structure 114 consisting of the damping compound 110 and the conducting elements 106, 107 is designed with an annular structural element 115. One part of the composite structure 114 is located inside the annular structural element 115. In the form of embodiment illustrated, the structural element 115 is also used to arrange the contacting elements 118, 119. The structural element 115 can, for example, be made of plastic. In the form of embodiment illustrated, the support 116 is formed of the composite structure 114 and the structural element 115 in such a way that they form a common termination that is located at a height.

In the illustrated example, a circuit board 120 is arranged at the support 116. In an exemplary manufacturing method for an ultrasound transducer 100, the adaptation layer 104, the piezoelectric oscillator 102, the conducting element or elements 106, 107, the contacting element or elements 118, 119 can first be arranged with one or a plurality of structural elements 115, and the damping compound then applied in a casting method, which in the case of an annular structural element 115 can also, for example, take place through the opening of the ring, so that the composite structure 114 is created through the combination of the damping compound 110 and the conducting element or elements 106, 107.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. An ultrasound transducer comprising:
   at least one piezoelectric oscillator;
   at least one electric conducting element having a composite structure and in contact with the at least piezoelectric oscillator;
   a damping compound having a composite structure and enclosing at least the at least one conducting element;
   wherein the composite structure of the at least one conducting element and of the damping compound is in contact over an area with the piezoelectric oscillator; and
   a support on the side of the ultrasound transducer that faces away from the piezoelectric oscillator on which the ultrasound transducer is configured to be supported, wherein oscillations of the piezoelectric oscillator are damped on their way through the composite structure of the damping compound and the at least one conducting element such that their amplitude at the support is weaker than at the piezoelectric oscillator by a factor of at least 10.

2. The ultrasound transducer as claimed in claim 1, wherein the length of the at least one conducting element corresponds to a working frequency of the piezoelectric oscillator such that the transmission of oscillation energy from the piezoelectric oscillator at the support is minimized in that a condition for an oscillation node is present at the support.

3. The ultrasound transducer as claimed in claim 2, wherein both the at least one conducting element considered in isolation, as well as the composite structure to which the at least one conducting element also belongs, correspond to a working frequency of the piezoelectric oscillator such that the transmission of oscillation energy from oscillations of the piezoelectric oscillator at the support is minimized in that the condition for an oscillation node is present at the support.

4. The ultrasound transducer as claimed in claim 2, wherein the condition for an oscillation node at the support is given in that at least one of: the length of the at least one conducting element and the distance between the piezoelectric oscillator and the support that is bridged by the composite structure, is an uneven multiple of one quarter of the wavelength corresponding to the working frequency of the piezoelectric oscillator.

5. The ultrasound transducer as claimed in claim 1, wherein the distance between the piezoelectric oscillator and the support that is bridged by the composite structure corresponds to a working frequency of the piezoelectric oscillator in such a way that the transmission of oscillation energy from the piezoelectric oscillator at the support is minimized in that a condition for an oscillation node is present at the support.

6. The ultrasound transducer as claimed in claim 1, wherein the least one conducting element is a helical springs.

7. The ultrasound transducer as claimed in claim 6, wherein at least two helical springs are used as conducting elements.

8. The ultrasound transducer as claimed in claim 6, wherein each of the two helical springs is in electrical contact with respectively one of the electrically separate regions of the metallization of the piezoelectric oscillator.

9. The ultrasound transducer as claimed in claim 1, wherein the surface of the piezoelectric oscillator has a metallization for electrical conducting in at least one region.

10. The ultrasound transducer as claimed in claim 9, wherein the piezoelectric oscillator comprises metallized regions on two opposite sides, wherein the surfaces of the sides of the oscillator that have the metallizations are at least partially covered by metallization, and wherein the metallization is carried over from a first side via a third side of the oscillator to a second side of the oscillator such that both metallizations form electrically separate regions on either of the first and the second side of the oscillator.

11. The ultrasound transducer as claimed in claim 10, wherein the surfaces of the sides of the oscillator that have the metallizations are wholly covered by metallization.

12. The ultrasound transducer as claimed in claim 10, wherein each of the two helical springs is in electrical contact with respectively one of the electrically separate regions of the metallization of the piezoelectric oscillator.

13. The ultrasound transducer as claimed in claim 1, wherein the ends of the conducting elements that are not in contact with the piezoelectric oscillator comprise contact regions with which electrical connections are made.

14. The ultrasound transducer as claimed in claim 1, wherein the support is one of:
supported on a circuit board directly and via one or a plurality of mediating structural elements.

15. The ultrasound transducer as claimed in claim 1, wherein the damping compound is an elastomer material.

16. The ultrasound transducer as claimed in claim 1, wherein the transducer is a measuring device for measuring a distance.

17. The ultrasound transducer as claimed in claim 1, wherein the transducer is a measuring device for pneumatic suspension apparatus.

18. The ultrasound transducer as claimed in claim 1, wherein the pneumatic suspension apparatus is for one of a motor vehicle and rail vehicle.

19. The ultrasound transducer as claimed in claim 1, wherein the transducer is a measuring device for one of a mining vehicle, an agricultural vehicle and agricultural attachment that uses the ultrasound transducer to control one of: a height, a level or a distance.

20. The ultrasound transducer as claimed in claim 1, wherein the transducer is a measuring device for regulation of a height adjustment of an industrial plant.

21. The ultrasound transducer as claimed in claim 1, wherein the transducer is a measuring device for controlling a seat height.

* * * * *